United States Patent
Treptau et al.

(10) Patent No.: US 6,594,418 B1
(45) Date of Patent: Jul. 15, 2003

(54) COMPACT OPTICAL MODULE WITH ADJUSTABLE MITER JOINT FOR DECOUPLED ALIGNMENT

(75) Inventors: Jeffrey P. Treptau, Lakeville, MN (US); Thomas J. Schmitt, Apple Valley, MN (US); Ronald E. Gerber, Richfield, MN (US); Timothy S. Gardner, Eden Prairie, MN (US); Edward C. Gage, Apple Valley, MN (US); Kevin D. Batko, Bloomington, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 10/138,163

(22) Filed: May 1, 2002

(51) Int. Cl.[7] ................................. G02B 6/32
(52) U.S. Cl. ........................ 385/33; 385/31; 385/35; 385/74; 385/77; 385/78; 385/79; 385/80
(58) Field of Search .............. 385/20–23, 31, 385/33, 35, 74, 77, 78, 79, 80

(56) References Cited

U.S. PATENT DOCUMENTS

| | | | | |
|---|---|---|---|---|
| 5,479,541 A | * | 12/1995 | Pan | 385/22 |
| 5,546,486 A | * | 8/1996 | Shih et al. | 385/31 |
| 6,023,542 A | * | 2/2000 | Pan et al. | 385/24 |
| 6,295,393 B1 | * | 9/2001 | Naganuma | 385/11 |
| 6,396,980 B1 | * | 5/2002 | Liu et al. | 385/34 |
| 6,498,876 B1 | * | 12/2002 | Liu et al. | 385/34 |
| 2002/0131699 A1 | * | 9/2002 | Raguin et al. | 385/33 |

* cited by examiner

Primary Examiner—Akm Enayet Ullah
Assistant Examiner—Jennifer Doan
(74) Attorney, Agent, or Firm—Altera Law Group, LLC

(57) ABSTRACT

Two sub-assemblies in a fiber optic device are fitted to respective end faces of a central section, along a longitudinal axis. The end faces of the central section are non-parallel. Butting the sub-assemblies to respective ends of the central section permits relative adjustment of the two sub-assemblies in substantially decoupled degrees of freedom. This results in a simpler adjustment procedure for aligning the two sub-assemblies. Furthermore, the mounting of the sub-assemblies using angled faces permits the use of relatively thin layers of adhesive that reduce misalignment problems arising from mismatched thermal expansion when the temperature changes.

21 Claims, 7 Drawing Sheets

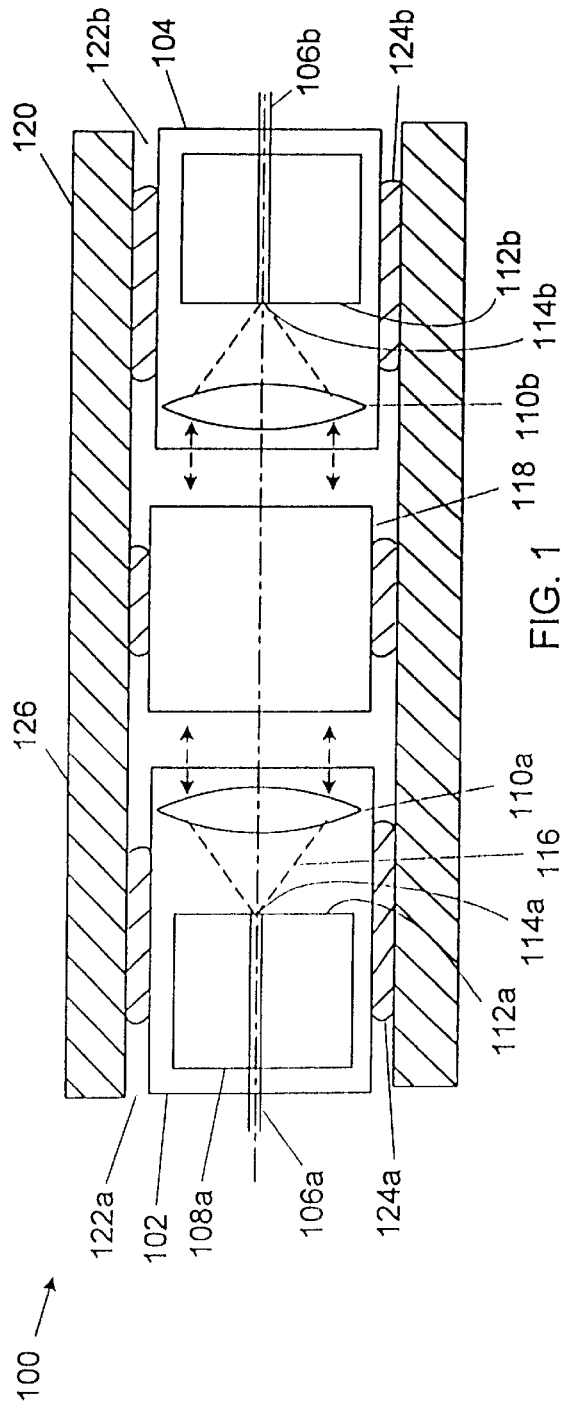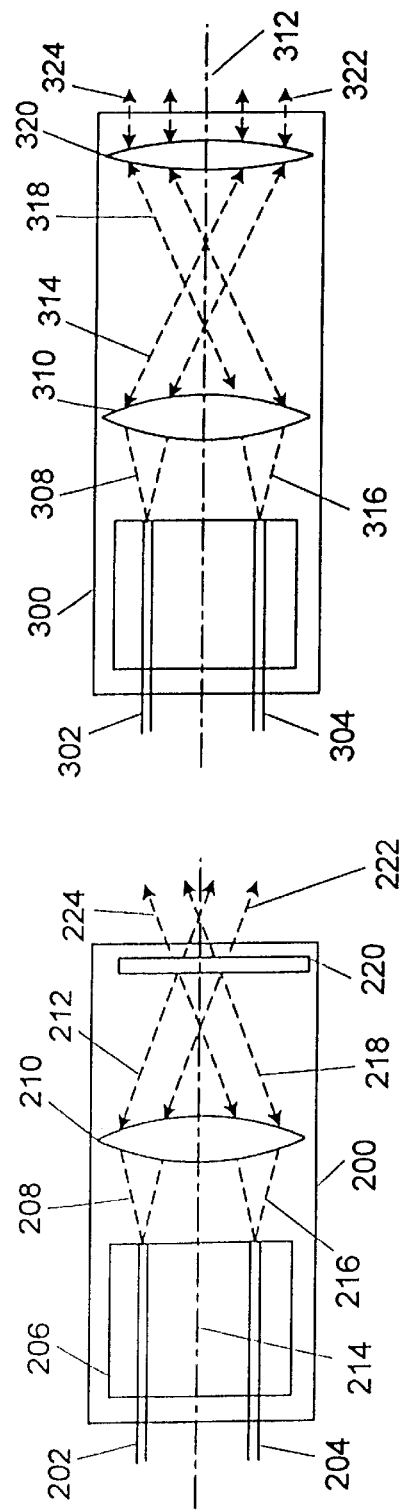

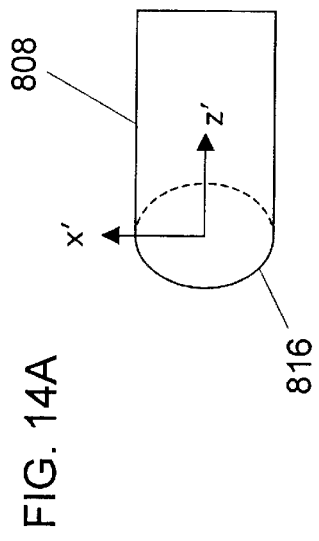
FIG. 14A
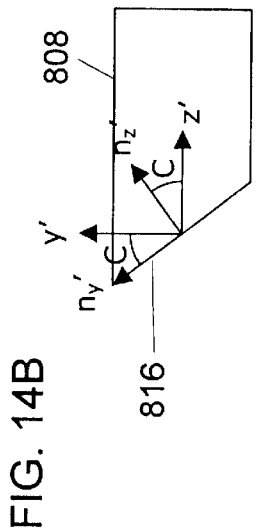
FIG. 14B
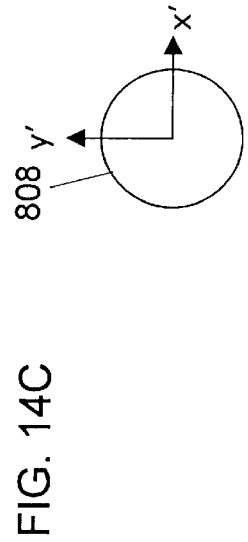
FIG. 14C
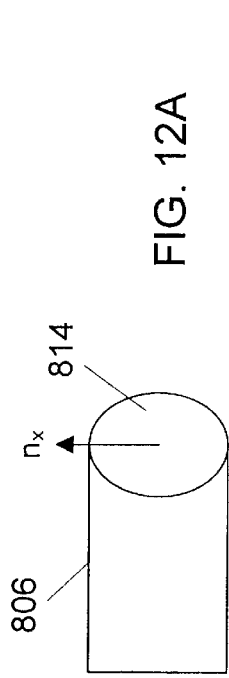
FIG. 12A
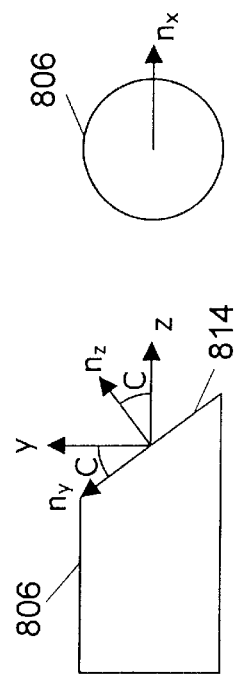
FIG. 12B
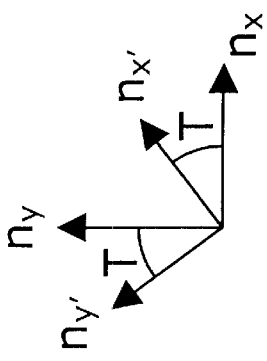
FIG. 12C
FIG. 13

COMPACT OPTICAL MODULE WITH ADJUSTABLE MITER JOINT FOR DECOUPLED ALIGNMENT

FIELD OF THE INVENTION

The present invention is directed generally to fiber optic devices, and more particularly to a method and apparatus for aligning a fiber optic device that includes collimator sub-assemblies.

BACKGROUND

Optical fibers find many uses for directing beams of light between two points. Optical fibers have been developed to have low loss, low dispersion, polarization maintaining properties and can also act as amplifiers. As a result, optical fiber systems find widespread use, for example in optical communication applications.

However, one of the important advantages of fiber optic beam transport, that of enclosing the optical beam to guide it between terminal points, is also a limitation. There are several optical components, important for use in fiber systems or in fiber system development, that are not implemented in a fiber-based form where the optical beam is guided in a waveguide. Instead, these optical components are implemented in a bulk form and through which the light propagates freely. Examples of such components include, but are not limited to, filters, isolators, circulators, polarizers, switches and shutters. Consequently, the inclusion of a bulk component in an optical fiber system necessitates that the optical fiber system have a section where the beam path propagates freely in space, rather than being guided within a fiber.

Free space propagation typically requires use of collimation units, also known as collimator sub-assemblies, at the ends of the fibers to produce collimated beams. Therefore, a device may have a collimator sub-assembly at each end, defining one or more collimated beam paths to their respective fibers. Light from an input fiber is collimated by the first collimator unit and passes through free space to the second collimator unit, where it is focused into an output fiber. One difficulty in manufacturing a fiber optic device is ensuring that the collimated beam paths from the two collimator sub-assemblies are collinear.

Mechanically, many of the prior art approaches to aligning collimator sub-assemblies are less than elegant. Typically, the two sub-assemblies are adjusted in space by tooling until good optical coupling is achieved. They are then immersed in a "sea of glue" to fix their positions. (The "sea of glue" fills the space between the outside of the sub-assembly and the inside of the module housing.) There are typically no mechanical supports for the sub-assemblies except for the glue itself. One of the drawbacks to the "sea of glue" is that the thermal expansions of the glue and the housing may be different, and so any asymmetry in the glue distribution may produce some shifting of the components as the temperature changes. Also the glue lines are thick, uneven, and vary from assembly to assembly. This leads to complex and, therefore, often labor intensive, procedures for aligning modules that include sub-assemblies.

SUMMARY OF THE INVENTION

Generally, the present invention relates to a module where two sub-assemblies are fitted to respective end faces of a central section. The end faces of the central section are non-parallel, and permit the adjustment of the two sub-assemblies in substantially decoupled degrees of freedom.

One particular embodiment of the invention is directed to a fiber optic device having a longitudinal axis. The device includes a first sub-housing disposed on the longitudinal axis and has first and second end faces. The first end face defines a first plane parallel to a first transverse axis perpendicular to the longitudinal axis, where the first plane is non-parallel to i) the longitudinal axis and ii) a second transverse axis that is perpendicular to both the longitudinal axis and the first transverse axis. The second end face defines a second plane parallel to the second transverse axis, where the second plane is non-parallel to i) the longitudinal axis and ii) the first transverse axis. The device also includes a second sub-housing disposed on the longitudinal axis and has a third end face parallel to the first end face. The third end face is fitted to the first end face. The device also includes a third sub-housing disposed on the longitudinal axis. The fourth sub-housing has a fourth end face fitted to the second end face of the first sub-housing.

Another embodiment of the invention is directed to a method of aligning a fiber device. The method includes providing a first sub-housing on a longitudinal axis. The first sub-housing has first and second end faces, where the first end face defines a first plane parallel to a first transverse axis perpendicular to the longitudinal axis. The first plane is non-parallel to i) the longitudinal axis and ii) a second transverse axis perpendicular to both the longitudinal axis and the first transverse axis. The second end face defines a second plane parallel to the second transverse axis. The second plane is non-parallel to i) the longitudinal axis and ii) the first transverse axis. The method also includes fitting a third end face of a second sub-housing to the first end face of the first sub-housing and fitting a fourth end face of a third sub-housing to the second end face of the first sub-housing. The method further includes adjusting position of the second sub-housing with the third end face fitted to the first end face and adjusting position of the third sub-housing with the fourth end face fitted to the second end face.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

The invention may be more completely understood in consideration of the following detailed description of various embodiments of the invention in connection with the accompanying drawings, in which:

FIG. 1 schematically illustrates a fiber optic device that includes two single fiber collimator sub-assemblies;

FIG. 2 schematically illustrates a fiber optic device that includes two dual fiber collimator sub-assemblies;

FIG. 3 schematically illustrates one embodiment of a multiple fiber collimator sub-assembly;

FIGS. 12A, 12B, and 12C schematically illustrate a co-ordinate system;

FIG. 13 schematically illustrates a co-ordinate transformation; and

FIGS. 14A, 14B, and 14C schematically illustrates a central section of the device according to the present invention with a transformed co-ordinate system.

Figure 4:
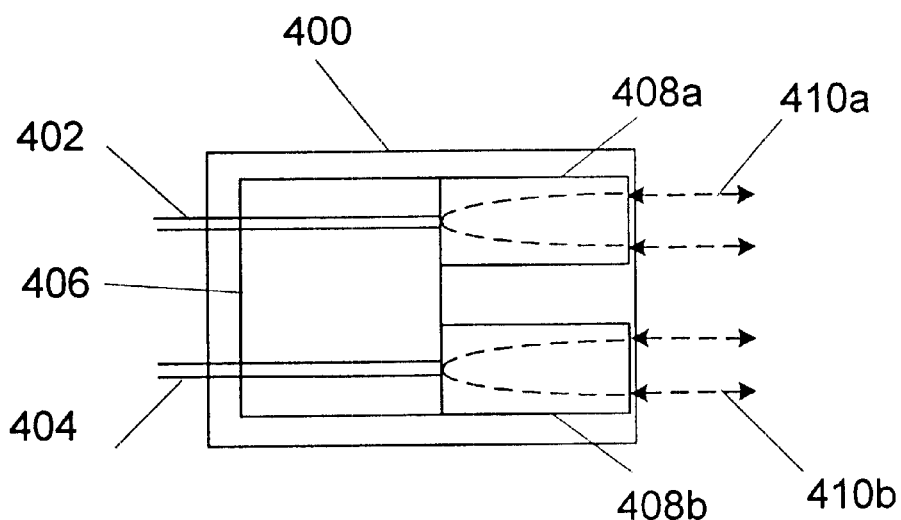
FIG. 4 schematically illustrates another embodiment of a multiple fiber collimator sub-assembly.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Generally, the present invention relates to a method and apparatus for aligning collimator sub-assemblies. The invention arises from a realization that prohibiting the two collimator sub-assemblies from being adjusted in the same degree of freedom leads to faster and easier alignment than is possible using conventional approaches.

The present invention is related to the implementation of decoupled adjustments of optical sub-assemblies, described further in U.S. patent application Ser. No. 10/138,169 entitled "Alignment of Collimator Sub-Assemblies", filed on even date herewith by R. Gerber and T. Gardner, and incorporated herein by reference.

A schematic illustration of one embodiment of a fiber optic device 100 is presented in FIG. 1. The device includes left and right single fiber collimator (SFC) sub-assemblies 102 and 104 mounted in opposing directions. Each sub-assembly includes a fiber 106a and 106b mounted in a ferrule 108a and 108b. A lens 110a and 110b is positioned to collimate light passing out of the respective fiber 106a and 106b, or to focus light into the respective fiber 106a and 106b. The lens 110a and 110b may be any type of suitable lens, including a gradient index (GRIN) lens, or a lens having a curved refractive surface, such as a spherical or aspherical lens. Typically, the ferrule end 112a and 112b and fiber end 114a and 114b are polished at a small angle to reduce back reflections.

Considering the example where light enters the device 100 through the left sub-assembly 102, the light 116 from the sub-assembly 102 is collimated, may pass through the optical component 118, disposed between the two sub-assemblies 102 and 104, to the second sub-assembly. The optical component 118 may be any suitable type of optical component that operates on the light propagating in free space, including but not restricted to an isolator, a filter, a polarizer, an attenuator, a switch, a shutter, or the like. It will also be appreciated that the light may pass from the right sub-assembly 104 to the left sub-assembly 102.

One or both of the sub-assemblies 102 and 104 may also include additional optical components not illustrated. For example, the left and/or right sub-assembly 102 and 104 may include a filter. Additionally, there may be no optical component 118 mounted within the housing separately from the sub-assemblies 102 and 104, with the only optical component(s) within the device 100 being mounted within the sub-assemblies 102 and 104 themselves.

The sub-assemblies 102 and 104 are often disposed within a housing 120. Typically, both the housing 120 and the sub-assemblies 102 and 104 are cylindrical in shape, so that the sub-assemblies 102 and 104 easily slip into the respective housing ends 122a and 122b. The sub-assemblies 102 and 104 are mounted within the housing 120 using respective bands of adhesive 124a and 124b. Likewise, the element 118 may be mounted in the housing 120 using adhesive 126. Often, the only mechanical support to the sub-assemblies 102 and 104 is provided by the adhesive 124a and 124b itself, which may not be applied evenly around the sub-assemblies 102 and 104. Due to the different thermal expansion coefficients of the adhesive 124a and 124b and the housing 120, typically formed of metal, any asymmetry in the adhesive 124a and 124b results in shifting, and subsequent misalignment, of the components with temperature.

Other types of collimator sub-assembly are illustrated in FIGS. 2–4. In FIG. 2, a dual fiber collimator (DFC) sub-assembly 200 includes two fibers 202 and 204 held in a dual fiber ferrule 206. Light 208 from the first fiber 202 is directed to a lens 210. The first fiber 202 is typically positioned at a distance from the lens 210 of about the focal length of the lens 210, so that the light 212 emerging from the lens 210 is approximately collimated. However, the first fiber 202 is not positioned on the axis 214 of the lens 210, and so the collimated light 212 does not propagate parallel to the axis 214. The light path 216 from the second fiber 204 to the lens 210 is likewise diverging and, following the lens 210, the light path 218 is collimated, but off-axis.

The DFC 200 may optionally include an optical component 220, such as an optical filter. In the particular embodiment illustrated, light 212 from the first fiber 202 is reflected as light 218 back to the second fiber 204 by the filter 220, while some light 222 is transmitted through the filter 220. There may also be a path 224 for light transmitted through the filter 220 that passes to the second fiber 204.

A DFC such as the DFC 200 is useful for introducing a collimated, but off-axis, light beam to an optical element, such as a filter. For example, a device having two opposing DFCs may be used with an interference filter between the DFCs to combine or separate light of different wavelengths, and is commonly used as a multiplexer or demultiplexer in optical communications systems that use multiple channel optical signals. DFCs are further described in U.S. patent applications Ser. Nos. 09/999,891, and 09/999,553, both of which are incorporated by reference.

Another type of collimator sub-assembly 300 is schematically illustrated in FIG. 3. This sub-assembly 300 uses two lenses to produce substantially collimated beams that propagate parallel to an axis, from two or more fibers. In the particular embodiment illustrated, two fibers 302 and 304 are mounted in a dual fiber ferrule 306. The light path 308 from the first fiber 302 diverges to the first lens 310. The first lens 310 focuses the light, reducing the divergence. Since the first fiber is not positioned on the lens axis 312, the light path 314 emerging from the first lens 310 crosses the axis 312. Likewise, the light path 316 from the second fiber diverges to the lens 310 and the light path 318 from the lens 310 is directed across the axis 312. A second lens 320 paralellizes the light paths 314 and 318 so that they propagate in a direction parallel to the axis 312.

This type of collimator sub-assembly may be used to produce substantially parallel beams from more than two fibers. Furthermore, with careful selection of the focal lengths of the lenses 310 and 320, and with careful selection of the relative spacings between the two lenses 310 and 320, and the fibers 302 and 304, the parallelized light paths 322 and 324 may be substantially collimated. This type of collimator sub-assembly is described in greater detail in U.S. Pat. No. 6,289,152, which is incorporated by reference.

The second lens 320 may be replaced with a biprism. However, this is effective at paralellizing only light from fibers set at one particular distance form the optical axis 312, whereas the approach using the second lens 320 is useful at parallelizing light from fibers set at different distances from the axis 312.

The sub-assembly 300 is useful for optical devices that require multiple, parallelized beams, for example isolators, circulators, and the like.

Another type of collimator sub-assembly 400 is illustrated in FIG. 4. The sub-assembly 400 includes at least two fibers 402 and 404 mounted in a ferrule 406. Each fiber 402 and 404 has a respective lens 408a and 408b disposed at its output to collimate the light 410a and 410b produced from the fibers 402 and 404. The lenses 408a and 408b may be GRIN lenses, as illustrated, or may be lenses having a curved refractive surface.

Like the sub-assembly 300 shown in FIG. 3, the sub-assembly 400 produces multiple parallel collimated beams from multiple fibers. However, this sub-assembly needs a single lens for each fiber, whereas the sub-assembly 300 is capable of producing collimated, parallel light paths using two fibers, irrespective of the number of fibers present.

It will be appreciated that in the different types of sub-assemblies illustrated in FIGS. 1–4, a lens described as collimating or focusing light emerging from a fiber may also be used to focus light into the fiber where the light propagates in the opposite direction from that described.

Fiber optic devices may be constructed using any of the collimator sub-assemblies discussed above. Furthermore, other collimator sub-assemblies, not described here, may be used in a fiber optic device. Additionally, a central section may be positioned within the housing between the sub-assemblies, for example to hold additional optical elements.

Figure 5:
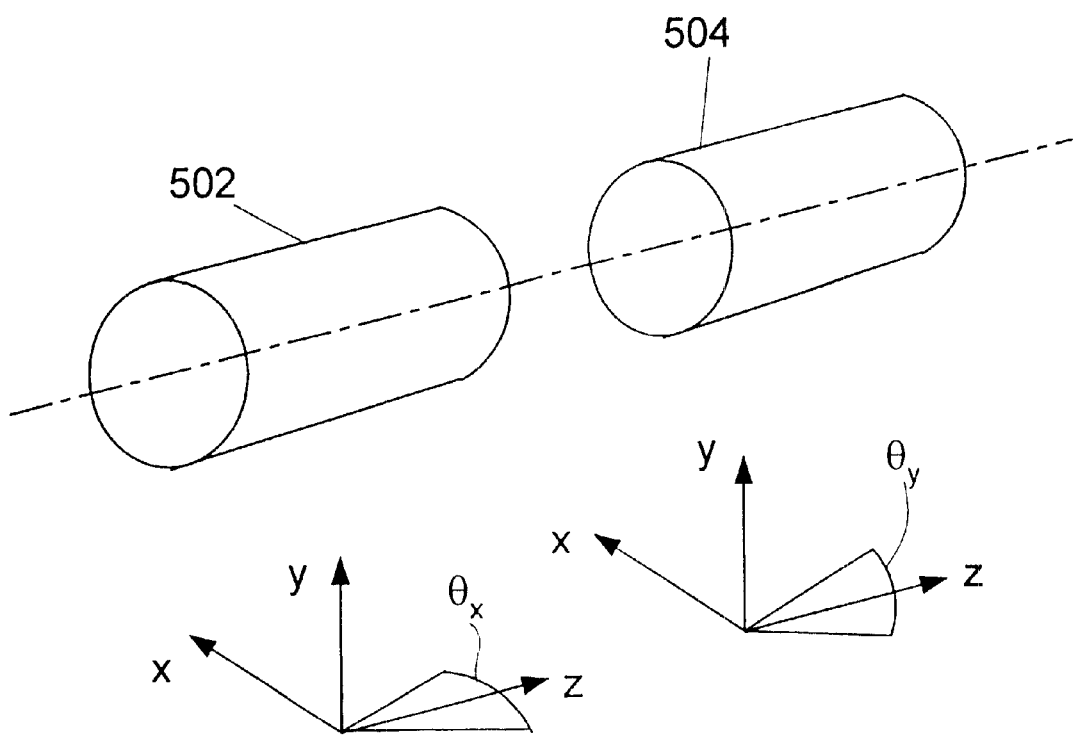
FIG. 5 schematically illustrates to collimator sub-assemblies and a co-ordinate system used for describing alignment of the collimator sub-assemblies.

One problem common to devices that use collimator sub-assemblies is in the relative alignment of the sub-assemblies, since there are so many degrees of freedom available for adjusting the sub-assemblies. This is schematically illustrated in FIG. 5, which shows two opposing sub-assemblies 502 and 504 aligned on an axis 506. According to the adopted co-ordinate system, the axis 506 lies parallel to the z-direction. Each sub-assembly 502 and 504 has the following four degrees of freedom: x, y, $\theta_x$, and $\theta_y$. The angle $\theta_x$ refers to orientational adjustment in the x-z plane and $\theta_y$ refers to orientational adjustment in the y-z plane. Since each sub-assembly 502 and 504 may have each of these four degrees of freedom, the device may be aligned by aligning each degree of freedom for each sub-assembly, which may be a long and tedious process. According to the present invention, a simplified approach to aligning the sub-assemblies may be reached by prohibiting the two collimator sub-assemblies from being adjusted in the same degree of freedom.

It can be shown mathematically that the x-direction and the y-direction are decoupled, and so x adjustments (x, $\theta_x$) may be made independently of y adjustments (y, $\theta_y$). Initially, we consider only x adjustments. Combinations for aligning the two sub-assemblies, labeled Left and Right, are listed in the following table.

TABLE I

One Dimensional Alignment Combinations for Two Sub-assemblies

| Combination No. | Left | Right |
| --- | --- | --- |
| 1 | x | x |
| 2 | $\theta_x$ | $\theta_x$ |
| 3 | $\theta_x$ | x |
| 4 | x, $\theta_x$ | <no adjust> |

Combination No. 1 may be ignored, because it provides no guarantee of aligning the sub-assemblies. According to Combination No. 2, the orientation angle of each sub-assembly is adjusted. The pivot points may be, for example, roughly about the exit face of the sub-assembly. There is no translation in this alignment scheme, just goniometric rotation. In practice, this approach to alignment entails adjusting $\theta_x$ for each sub-assembly alternately, first adjusting the left sub-assembly, then the right sub-assembly, then the left sub-assembly again and so on, while monitoring the amount of light coupled through the device from one sub-assembly to the other.

Figure 6:
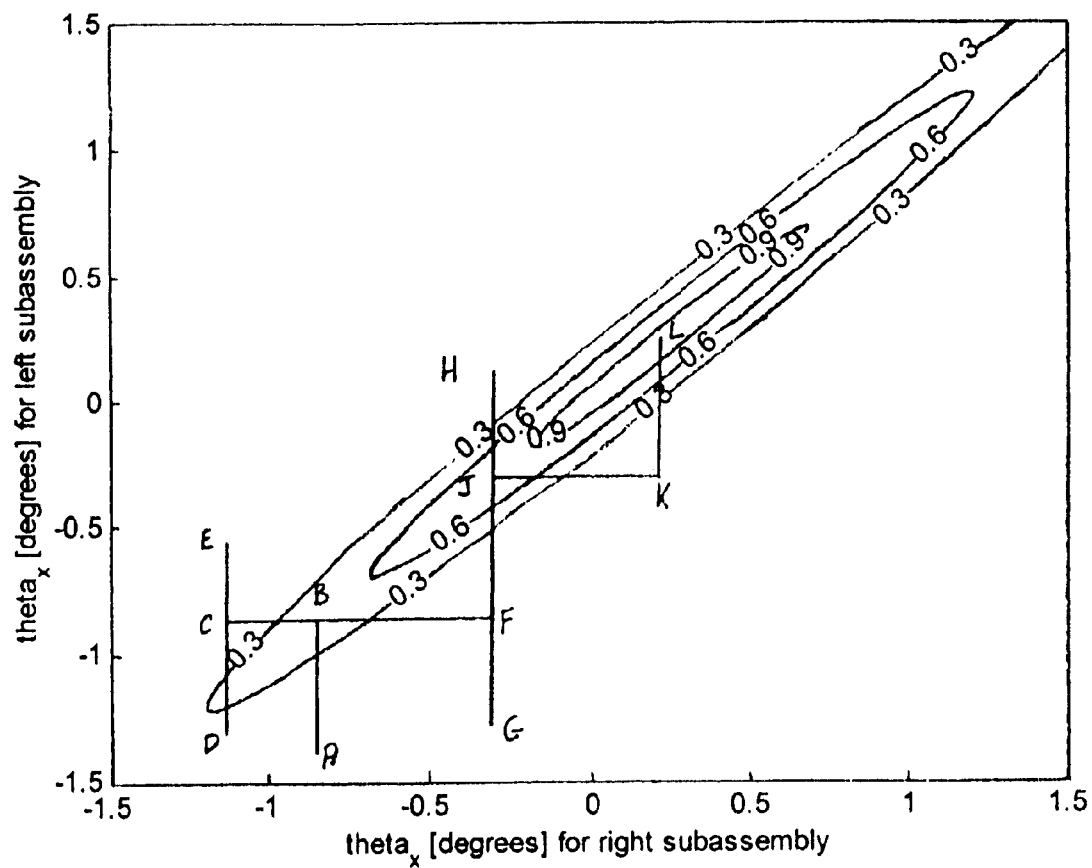
FIG. 6 presents a graph showing coupling between two single fiber sub-assemblies where each sub-assembly is adjustable in the same degree of freedom.

A graph showing calculated contours of equal coupling values is illustrated in FIG. 6. The abscissa shows the value of $\theta_x$ in degrees, for the right sub-assembly while the ordinate shows the value of $\theta_x$, in degrees, for the left sub-assembly.

A straightforward approach to aligning the sub-assemblies, which involves adjusting the value of $\theta_x$, for only one assembly at a time, is to set the value of $\theta_x$ for one sub-assembly to a first value, optimize the optical coupling to a first optimized value by adjusting $\theta_x$ for the other sub-assembly, optimize the optical coupling to a second optimized value by adjusting $\theta_x$ for the first sub-assembly, and continuing on, in this fashion, alternating between sub-assemblies until the point of maximum coupling is reached.

This approach is partially illustrated in FIG. 6. An arbitrary start point for the initial alignment is given by point A. Rotation of the left sub-assembly takes the alignment to point B, where the line AB is tangent to one of the contour lines. Rotation of the right sub-assembly will take the alignment to a second optimal point between B and F where the line BF is tangent to a second contour line. The coupling value at this second point will be higher than at point B. Rotation of the sub-assemblies continues to alternate in this fashion, following a series of steepest ascent paths, via points F, J, and K, that eventually leads to the point of optimal coupling, at point L. It was assumed for generating these plots that the light beam had a $1/e^2$ half width of 140 μm and that the sub-assemblies were separated by 6 mm.

Because the elliptical contours are very narrow, the change in rotation angle and coupling efficiency from one optimal point to the next tend to be small. It is difficult for alignment stages and coupling measurement instruments to resolve these small changes with the result that no discernment may be made between sequential optimum points and further iteration is impossible. Even with ideal instrumentation, the small steps from optimal point to optimal point results in a large number of iterations, therefore increasing the time taken to perform the alignment, before convergence to the maximum coupling value. Coupling contours with elliptical aspect ratios approaching that for a circle reduce the demands on instrument resolution and result in rapid convergence to the point of maximum coupling.

The goal of these two procedures may be viewed as moving the device's operating point from a random starting point on the graph, set by the initial alignment between the two sub-assemblies, "up the hill" to the maximum possible value of optical coupling. The center of the elliptical contours represents optimal coupling between the sub-assemblies, and the alignment process should guarantee that the the final operating point is set at the center of the ellipses regardless of the position of the initial operating point. Also, it is advantageous for the alignment process to reach the point of maximum coupling with a small number of steps.

The problem with this alignment process is that movement is made only in horizontal and vertical steps. An adjustment of $\theta_x$ for the left sub-assembly moves the value of optical coupling to a local peak value. The narrowness of the elliptical contours results in making many small alignment steps. The resolution of these these small steps may be difficult for many alignment tools to achieve. Futhermore, the large number of alignment steps increases the length of time requried to aligne the fiber optic device.

Figure 7:
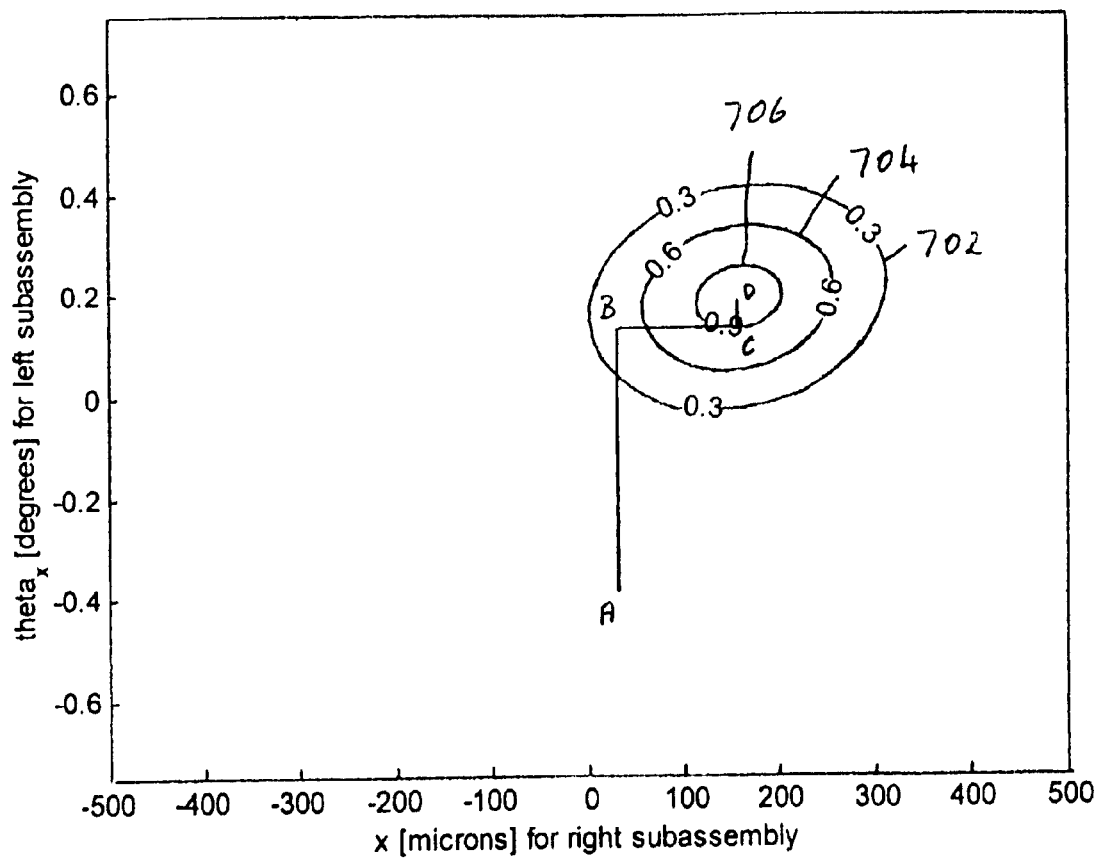
FIG. 7 presents a graph showing coupling between two single fiber sub-assemblies where the sub-assemblies are not adjustable in the same degree of freedom.

We now consider alignment Combination No. 3, in which one of the sub-assemblies is translated, and the other sub-assembly is rotated. A plot showing calculated contours of equal optical coupling between sub-assemblies for this alignment option is displayed in FIG. 7. The abscissa shows the value of x for the right sub-assembly, in microns, while the ordinate shows the value of $\theta_x$ for the left sub-assembly.

The contours 702, 704 and 706 are in the form of ellipses whose axes are nearly aligned with the horizontal and vertical axes of the plot, and therefore the alignments are nearly decoupled. From any starting location in the plane, the alignment corresponding to maximum optical coupling between the sub-assemblies may be reached in just a few iterations. For example, if the initial alignment of the sub-assemblies is at point A, then the operator may rotate the left sub-assembly to move the device alignment to point B. Translation of the right sub-assembly may bring the alignment to point C, and further rotation of the left sub-assembly brings the operating point to position D, which is close to optimal.

The slight misalignment of the elliptical contours arises because there is a separation between the pivot point of one sub-assembly and the back focal plane of the lens in the other sub-assembly. The greater the separation, the more these axes of ellipses are tilted relative to the axes of the graph, resulting in greater coupling between these two adjustments in x and $\theta_x$. It is advantageous for the separation to be zero, in which case the axes of the ellipses are aligned parallel to the axes of the graph, and the adjustments in x and $\theta_x$ are completely decoupled. A separation of 6 mm between the pivot point of the left sub-assembly and the back focal plane of the right sub-assembly was assumed to generate the contours illustrated in FIG. 7, while the $1/e^2$ half beam width was 140 μm, and the wavelength of light was 1.55 μm.

Since the alignments for the (x, $\theta_x$) alignment scheme are almost decoupled, this scheme is preferred over the ($\theta_x$, $\theta_x$) scheme: it is much simpler to align using the (x, $\theta_x$) scheme than the ($\theta_x$, $\theta_x$), there are fewer steps involved and the alignment may be performed faster. Furthermore, the alignment may be performed with operators that are less highly trained.

Combination No. 4 is similar to Combination No. 3, except that in this case the x and $\theta_x$ adjustments are both performed on the same sub-assembly. It is a matter of choice as to whether both adjustments should be done on one sub-assembly, or one adjustment should be done on each sub-assembly.

The above description of alignment in x and $\theta_x$ also holds for y-adjustments, in other words translations parallel to the y-axis and rotations of $\theta_y$. Therefore, combining the different options for making x- and y-adjustments, the following alignment options listed in Table II have substantially decoupled adjustments.

TABLE II

Two Dimensional Alignment Combinations for Two Sub-assemblies

| Left | Right |
| --- | --- |
| x | y, $\theta_x$, $\theta_y$ |
| y | x, $\theta_x$, $\theta_y$ |
| $\theta_y$ | x, y, $\theta_x$ |
| $\theta_x$ | x, y, $\theta_y$ |
| x, y | $\theta_x$, $\theta_y$ |
| x, $\theta_x$ | y, $\theta_y$ |
| x, $\theta_y$ | y, $\theta_x$ |
| x, y, $\theta_x$, $\theta_y$ | <no adjust> |

The choice of which alignment option to use is left to the designer. It will be appreciated that the right and left sub-assemblies may be exchanged for each other with no significant effect. Thus, for example, a device in which the left sub-assembly is adjustable in x, while the right sub-assembly is adjustable in y, $\theta_x$, and $\theta_y$, is equivalent to a device in which the right sub-assembly is adjustable in x, while the left sub-assembly is adjustable in y, $\theta_x$, and $\theta_y$.

Figure 8:
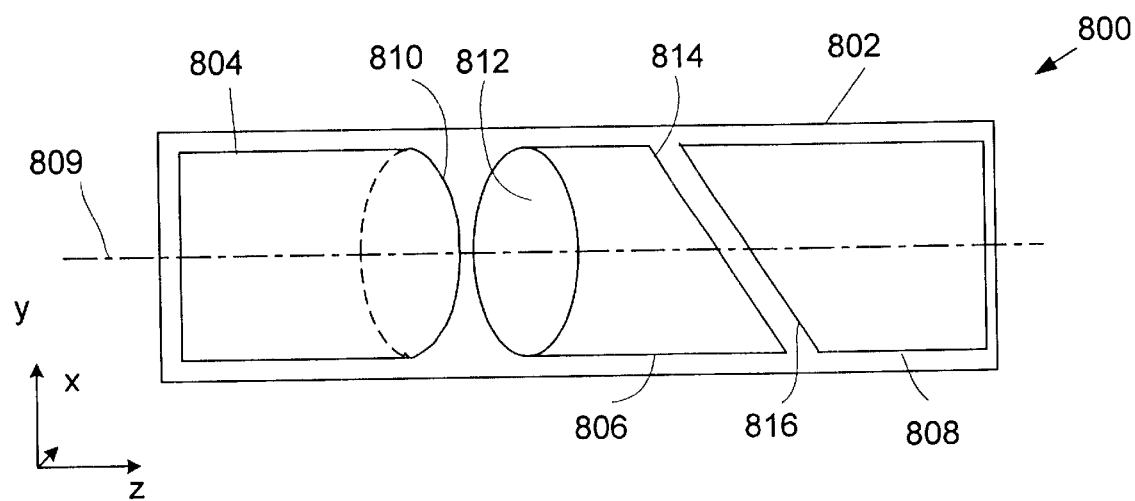
FIG. 8 schematically illustrates an embodiment of a device formed from two sub-assemblies, according to an embodiment of the present invention.

One approach to implementing a device 800 in which the two sub-assemblies are adjusted in decoupled degrees of freedom is illustrated schematically in FIG. 8, which includes an outer housing 802 that houses a first sub-assembly housing 804, a central section housing 806 and a second sub-assembly housing 808. In the illustrated embodiment, the sub-assemblies 804 and 808 and the central section housing 806 are cylindrical in cross-section, although this is not a requirement. The housings 804, 806 and 808 are shown separated along the device axis 809, although this need not be the case, and the housings 804, 806 and 808 may be advantageously in contact. Contact between the housings reduces the thickness of the adhesive between the housings, thus reducing the problems arising due to the differential expansion of thick, uneven portions of adhesive under increasing temperatures.

The first sub-assembly housing 804 has an angled face 810 and the central section housing 806 has a first angled face 812 opposing the angled face 810. A first interface is formed between the first sub-assembly housing 804 and the central section housing 806 by the angled faces 810 and 812. The central section housing 806 has a second angled face 814 and the second sub-assembly housing 808 also has an angled face 816 opposing the second angled face 814. A second interface is formed between the second sub-assembly housing 808 and the central section housing 806 by the angled faces 814 and 816.

The geometry with the angled interface between adjacent sections resembles a miter joint. Where the central section 806 remains fixed within the outer housing 802, the following adjustments may be applied to the different sub-assemblies 804 and 808 as follows:

1) the first sub-assembly 804 pivots about the normal to the faces 810 and 812 (small rotations result in $\theta_y$ adjustment);
2) the first sub-assembly 804 translates at the interface 810 in the y-direction (up/down in the figure);
3) the second sub-assembly 808 pivots about the normal to the faces 814 and 816 (small rotations result in $\theta_x$ adjustment); and
4) the second sub-assembly 808 translates at the interface 812 in the x-direction (into/out of the figure).

Two other translations are possible, namely:

5) the first sub-assembly 804 translates in the x direction (into/out of the figure); and
6) the second sub-assembly 808 translates in the y-direction (up/down in the figure).

Adjustments Nos. 5) and 6) are less preferable for aligning the three units 804, 806 and 808, because they change the axial spacing between the sub-assemblies 804 and 808, whereas translations 2) and 4) preserve the axial spacing between the sub-assemblies 804 and 808. One potential advantage of adjustments Nos. 5) and 6) is that they may be used in an initial aligning step in which the light beam passing through the device 800 is centered on an aperture in the central section housing 806.

Figure 9:
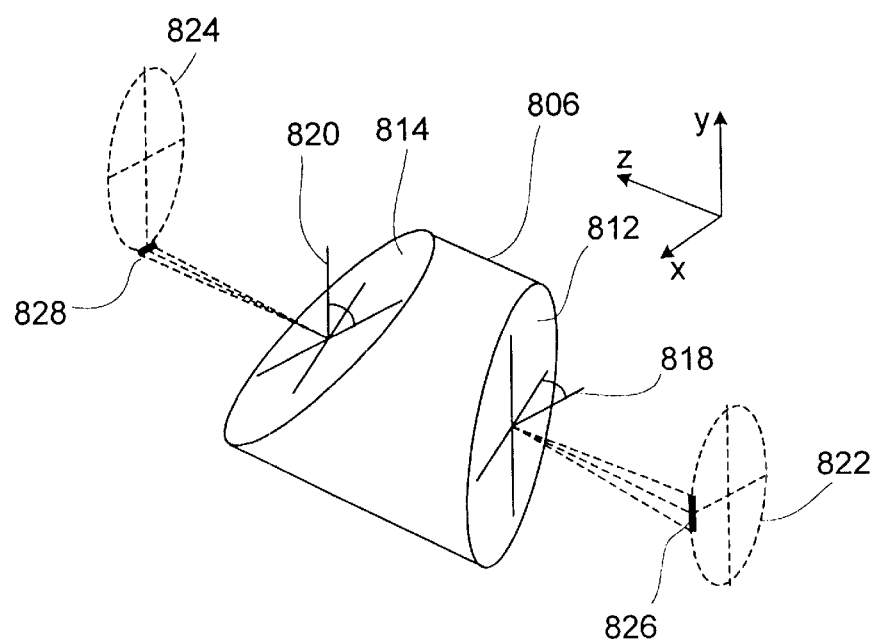
FIG. 9 schematically illustrates the central housing in the device of FIG. 8.

The effect of the two rotations, adjustments 1) and 3) is explained further with reference to FIG. 9, which shows the central section housing 806 in perspective view and lines 818 and 820 from the faces 812 and 814 that are parallel to y and x-axes respectively. The first sub-assembly 804 may be rotated about a normal to the angled face 812 of the central section 806 so that its angled face 810 stays parallel with the angled face 812. For example, the angled face 810 may be in contact with the angled face 812. If the first sub-assembly is rotated 360 ° about the normal to the angled face 812, then the first sub-assembly 804 traces out an ellipse 824, shown in a dashed line. Likewise, the second sub-assembly 808 may be rotated about a normal to the angled face 814 of the central section 806 so that its angled face 816 stays parallel with the angled face 814. For example, the angled face 816 may be in contact with the angled face 814. If the second sub-assembly 808 is rotated 360° about the normal to the angled face 814, then the second sub-assembly 808 traces out an ellipse 822, shown in a dashed line.

As a practical matter, however, only small rotations of the subassemblies 804 and 808 are required for aligning the device 800. The dark arcs 826 and 828 respectively represent the range of angles about which the first and second sub-assemblies 804 and 808 are rotated in order to achieve alignment. The arc 826 represents rotation primarily of $\theta_y$, while the arc 828 represents rotation primarily of $\theta_x$.

Figure 10:
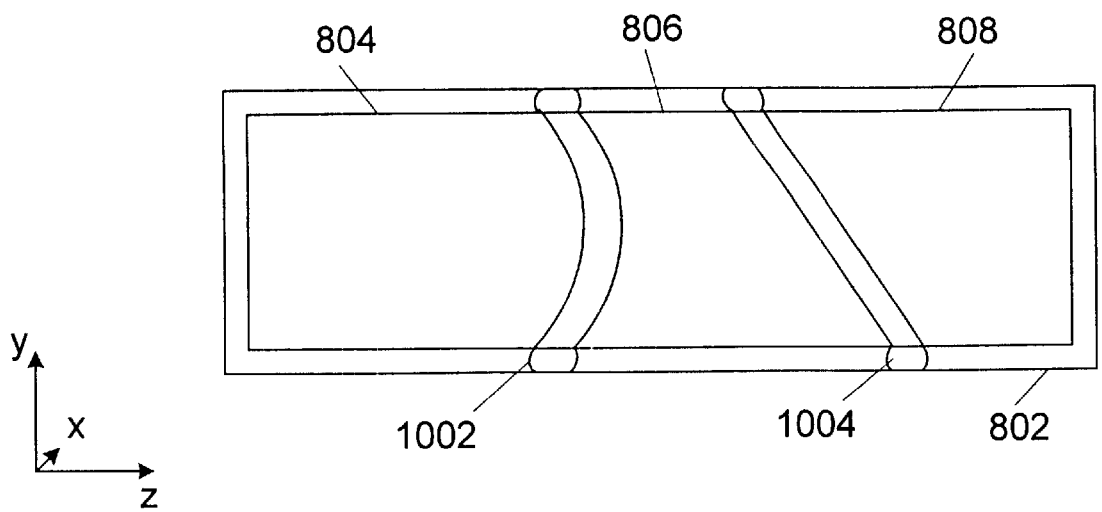
FIG. 10 schematically illustrates the device of FIG. 10 in a housing, according to an embodiment of the present invention.

After the two sub-assemblies 804 and 808 have been aligned and efficient optical coupling between the two sub-assemblies 804 and 808 has been achieved, the sub-assemblies 804 and 808 may be bonded to the center section 806. For example, an epoxy or other suitable type of adhesive may be used about the peripheries of the angled faces 810, 812, 814 and 816. Also, the sub-assemblies 804 and 808 may be attached to the center section 806 by any other suitable method, including welding or soldering. One or more of the central section 806 and the sub-assemblies 804 and 808 may also be supported within the outer housing 802 by an adhesive. For example, a first glue line 1002 about the interface between the faces 810 and 812, and another glue line 1004 about the interface between the faces 814 and 816, as illustrated in FIG. 10 may protrude radially beyond the sub-assemblies 804 and 808, and the central section 806, to adhere to the inner wall 1006 of the outer housing 802. Thus the two glue lines 1002 and 1004 may suffice to hold the sub-assemblies 804 and 808, and the central section 806 in place within the housing 802. An advantage of this approach is that the "sea of glue" present in previous devices is avoided, and so problems due to thermal expansion mismatches are reduced.

Figure 11A:
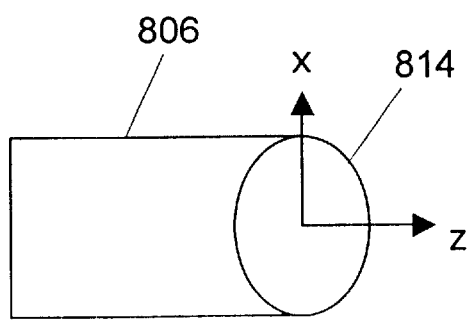
FIGS. 11A, 11B, and 11C, schematically illustrates a central section of a device according to an embodiment of the present invention.
Figure 11B:
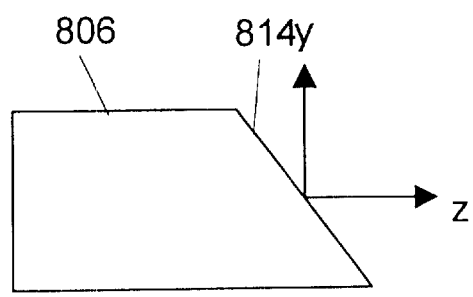
Figure 11C:
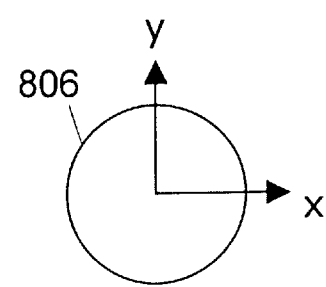

There now follows a physical analysis of the device 800. In order to obtain the exiting angles of light in one arm of the device 800, we perform three coordinate transformations. First, the initial coordinates (x,y,z) are aligned with the central section 806 portion of the housing, as illustrated in FIGS. 11A–11C which show orthogonal views of a portion of the central section 806, along with the second angled face 814 that is angled in the y-z plane. The light beam is initially assumed to propagate along the z-direction. The initial coordinates (x,y,z) may be transformed into the surface coordinates $(n_x, n_y, n_z)$, as shown in FIGS. 12A–12C, using the transformation:

$$\begin{pmatrix} \hat{n}_x \\ \hat{n}_y \\ \hat{n}_z \end{pmatrix} = \begin{pmatrix} 1 & 0 & 0 \\ 0 & \cos C & -\sin C \\ 0 & \sin C & \cos C \end{pmatrix} \begin{pmatrix} \hat{x} \\ \hat{y} \\ \hat{z} \end{pmatrix}$$

The surface normal is $n_z$. Initial coordinate x becomes $n_x$, and both y and z are rotated by cut angle C into $n_y$ and $n_z$, respectively.

For adjustment, a part is rotated by angle T around the surface normal $n_z$. Denoting rotated coordinates by a prime ('), the surface coordinates $(n_x, n_y, n_z)$ are transformed into rotated surface coordinates $(n_x', n_y', n_z')$, illustrated in FIG. 13, using the transformation:

$$\begin{pmatrix} \hat{n}_x' \\ \hat{n}_y' \\ \hat{n}_z' \end{pmatrix} = \begin{pmatrix} \cos T & \sin T & 0 \\ -\sin T & \cos T & 0 \\ 0 & 0 & 1 \end{pmatrix} \begin{pmatrix} \hat{n}_x \\ \hat{n}_y \\ \hat{n}_z \end{pmatrix}$$

Coordinate $n_z$ becomes $n_z'$ directly, and $n_x$ and $n_y$ are rotated by tilt angle T to become $n_x'$ and $n_y'$, respectively.

Finally, the rotated surface coordinates $(n_x', n_y', n_z')$ are transformed into a coordinate system (x',y',z') aligned with the adjustable arm, for example the second sub-assembly 808, as illustrated in FIG. 14, using the transformation:

$$\begin{pmatrix} \hat{x}' \\ \hat{y}' \\ \hat{z}' \end{pmatrix} = \begin{pmatrix} 1 & 0 & 0 \\ 0 & \cos C & \sin C \\ 0 & -\sin C & \cos C \end{pmatrix} \begin{pmatrix} \hat{n}_x' \\ \hat{n}_y' \\ \hat{n}_z' \end{pmatrix}$$

Thus, the full coordinate transformation may be written as follows:

$$\begin{pmatrix} \hat{x}' \\ \hat{y}' \\ \hat{z}' \end{pmatrix} = \begin{pmatrix} 1 & 0 & 0 \\ 0 & \cos C & \sin C \\ 0 & -\sin C & \cos C \end{pmatrix} \begin{pmatrix} \cos T & \sin T & 0 \\ -\sin T & \cos T & 0 \\ 0 & 0 & 1 \end{pmatrix} \begin{pmatrix} 1 & 0 & 0 \\ 0 & \cos C & -\sin C \\ 0 & \sin C & \cos C \end{pmatrix} \begin{pmatrix} \hat{x} \\ \hat{y} \\ \hat{z} \end{pmatrix}$$

One important quantity is the unit vector z' in the transformed space. The components in x and y give the angular offsets of the beam as the subassemblies are adjusted by an angle T:

$\hat{z}$[sin $C$ sin $T$]$\hat{x}$+[cos $C$ sin $C$(1−cos $T$)]$\hat{y}$+[cos$^2C$+sin$^2C$ cos $T$]$\hat{z}$ For small angles T, sin T=T, and cos T=1−T$^2$/2, where the angle T is measured in radians. Thus, the component of the rotated z' direction that lies along the original x direction, $\hat{z}'_x$, and the component of the rotated z' direction that lies along the original y direction, $\hat{z}'_y$, are given by:

$$\hat{z}'_y = T^2 \times \frac{\cos C \sin C}{2}$$

The z'$_x$ term is particularly interesting, since it shows that, for a cut angle C, there is a demagnification of (sin C) between the tilt angle T and the output arm pivot component z'$_x$. The z'$_y$ term is undesirable, and describes how much of the desired rotation leaks into the wrong component. For small T, this component is quite small, and poses no problems in an alignment scheme.

For a cut angle of C=15°, the demagnification factor is sin C=0.26 and, therefore, the tilt required to sweep out a beam pivot of 1° is T=3.9°. The undesirable beam pivot associated with this adjustment in the wrong direction is 0.033°, and is negligibly small, especially during an iterative alignment step.

If the analysis is repeated with a cut angle of C=30°, sin C=0.5, then the tilt required to sweep out a beam pivot of 1° is T=2°. The undesirable beam pivot associated with this adjustment is only 0.015°. Thus, the amount of undesired rotation constitutes less than 2% of the desired rotation.

Therefore, use of a miter joint provides effective decoupling between adjustments of $\theta_x$ and $\theta_y$, permitting the decoupled adjustment discussed above. It also enables contact between sub-assemblies and the central housing, thus avoiding thick portions of adhesive that may give rise to misalignment problems due to unmatched thermal expansion.

It will be appreciated that the entire end face of the central section and the sub-assemblies is not needed to define the parallel surfaces between the sub-assemblies and the central section that lie at an angle relative to the longitudinal axis of the device. Instead, only portions of these end faces may be used to define the parallel surfaces.

Another approach to providing separate, decoupled adjustment to a device having two collimator sub-assemblies is discussed in U.S. patent application Ser. No. 10/138,168, entitled "Compact Optical Module with Adjustable Joint for Decoupled Alignment", filed on even date herewith by T. Schmitt, J. Treptau, R. Gerber, T. Gardner, E. Gage and K. Batko, and incorporated herein by reference.

The invention may be practiced with any type of collimator sub-assembly, and is not restricted to use with those sub-assemblies described above.

As noted above, the present invention is applicable to aligning sub-assembly modules and is believed to be particularly useful for providing orthogonal degrees of freedom for easier alignment of sub-assembly modules. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A fiber optic device having a longitudinal axis, comprising:
   a first sub-housing disposed on the longitudinal axis and having first and second end faces, the first end face defining a first plane parallel to a first transverse axis perpendicular to the longitudinal axis, the first plane being non-parallel to i) the longitudinal axis and ii) a second transverse axis perpendicular to both the longitudinal axis and the first transverse axis, the second end face defining a second plane parallel to the second transverse axis, the second plane being non-parallel to i) the longitudinal axis and ii) the first transverse axis;
   a second sub-housing disposed on the longitudinal axis and having a third end face parallel to the first end face, the third end face being fitted to the first end face; and
   a third sub-housing disposed on the longitudinal axis and having a fourth end face parallel to the second end face, the fourth end face being fitted to the second end face of the first sub-housing.

2. A device as recited in claim 1, wherein the second sub-housing includes a first collimator sub-assembly and the third sub-housing includes a second collimator sub-assembly.

3. A device as recited in claim 2, wherein the second and third sub-housings are mutually aligned for optimal optical coupling between first and second collimator sub-assemblies.

4. A device as recited in claim 2, wherein at least one of the first and second collimator sub-assemblies is a single fiber collimator.

5. A device as recited in claim 2, wherein at least one of the first and second collimator sub-assemblies is a dual fiber collimator.

6. A device as recited in claim 1, wherein the second and third sub-housings are to attached to the first sub-housing.

7. A device as recited in claim 1, comprising adhesive disposed between the first end face of the first sub-housing and the third end face of the second sub-housing and between the second end face of the first sub-housing and the fourth end face of the third sub-housing.

8. A device as recited in claim 1, further comprising an outer housing, the first, second and third sub-housings being positioned within the outer housing.

9. A device as recited in claim 8, further comprising adhesive disposed between the outer housing and at least one of the first, second and third sub-housings to support the first, second and third sub-housings within the outer housing.

10. A device as recited in claim 1, further comprising an optical isolator disposed in at least one of the first, second and third sub-housings.

11. A device as recited in claim 1, wherein a normal to the first end face and the longitudinal axis define an angle of at least 15°.

12. A device as recited in claim 11, wherein the angle is at least 30°.

13. A method of aligning a fiber device, comprising:
   providing a first sub-housing on a longitudinal axis, the first sub-housing having first and second end faces, the first end face defining a first plane parallel to a first transverse axis perpendicular to the longitudinal axis, the first plane being non-parallel to i) the longitudinal axis and ii) a second transverse axis perpendicular to both the longitudinal axis and the first transverse axis, the second end face defining a second plane parallel to the second transverse axis, the second plane being non-parallel to i) the longitudinal axis and ii) the first transverse axis;

fitting a third end face of a second sub-housing to the first end face of the first sub-housing;

fitting a fourth end face of a third sub-housing to the second end face of the first sub-housing;

adjusting position of the second sub-housing with the third end face fitted to the first end face; and adjusting position of the third sub-housing with the fourth end face fitted to the second end face.

14. A method as recited in claim 13, wherein adjusting position of the second sub-housing includes rotating the second sub-housing about a normal to the first end face with the third end-face fitted to the first end face.

15. A method as recited in claim 13, wherein adjusting position of the third sub-housing includes rotating the third sub-housing about a normal to the second end face with the fourth end-face fitted to the second end face.

16. A method as recited in claim 13, wherein adjusting position of the second sub-housing includes translating the second sub-housing in a direction parallel to the first transverse axis.

17. A method as recited in claim 13, wherein adjusting position of the third sub-housing includes translating the third sub-housing in a direction parallel to the second transverse axis.

18. A method as recited in claim 13, further including adjusting the positions of the fitted third and fourth alignment surfaces so as to maximize optical coupling between the second and third sub-housings.

19. A method as recited in claim 13, further comprising fixing positions of the second and third sub-housings relative to the first sub-housing after adjusting the positions of the fitted and fourth alignment surfaces.

20. A method as recited in claim 19, wherein fixing the positions of second and third sub-housings includes applying adhesive between the first and second sub-housings and between the first and third sub-housings and curing the adhesive.

21. A method as recited in claim 13, further comprising supporting the first, second and third sub-housings within an outer housing.

* * * * *